US008133568B2

(12) United States Patent
Rockwell

(10) Patent No.: US 8,133,568 B2
(45) **Date of Patent: *Mar. 13, 2012**

(54) DIE CUT INSULATION BLANKET

(75) Inventor: Anthony L. Rockwell, Pickerington, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 895 days.

This patent is subject to a terminal disclaimer.

(21) Appl. No.: 12/176,012

(22) Filed: Jul. 18, 2008

(65) Prior Publication Data

US 2008/0317996 A1 Dec. 25, 2008

Related U.S. Application Data

(63) Continuation-in-part of application No. 11/209,005, filed on Aug. 22, 2005, now Pat. No. 7,923,092.

(51) Int. Cl.
*B32B 3/12* (2006.01)
*E04B 1/74* (2006.01)
*B32B 3/00* (2006.01)

(52) U.S. Cl. .......... 428/116; 428/73; 428/327; 428/192; 264/630; 52/404.1

(58) Field of Classification Search ........................ None
See application file for complete search history.

(56) References Cited

U.S. PATENT DOCUMENTS

| | | | |
|---|---|---|---|
| 514,663 | A | 2/1894 | Pitt |
| 1,714,058 | A | 5/1929 | Tirifahy |
| 2,001,632 | A | 5/1935 | Schlighting |
| 2,254,837 | A | 9/1941 | Burns |
| 2,342,839 | A | 2/1944 | Byers |
| 2,542,840 | A | 2/1951 | Riddle |
| 3,017,022 | A | 1/1962 | Lee |
| 3,461,026 | A | 8/1969 | Schick |
| 3,542,550 | A | 11/1970 | Leonard et al. |
| 3,557,901 | A | 1/1971 | Young |

(Continued)

FOREIGN PATENT DOCUMENTS

| | | |
|---|---|---|
| DE | 42 27 957 | 2/1994 |

(Continued)

OTHER PUBLICATIONS

Patent Publication DE20200512521, Published Nov. 24, 2005, Abstract & Figure submitted herein.*

(Continued)

*Primary Examiner* — David Sample
*Assistant Examiner* — Nicole Gugliotta
(74) *Attorney, Agent, or Firm* — Calfee, Halter & Griswold LLP

(57) ABSTRACT

An expandable insulation blanket includes a body of insulation material having a first edge and a second edge wherein the first and second edges are opposite one another. A first slit defines a first hinge point between a first end of the first slit and the first edge, a second hinge point between a second end of the first slit and the second edge and a third hinge point between a third end of the first slit and the first edge. A first hinge body is outlined by the first slit, the first hinge point and the third hinge point. A second slit extends across the first hinge body and defines a fourth hinge point between the second slit and the first slit. When expanded the insulation body includes a substantially triangular shaped opening.

19 Claims, 3 Drawing Sheets

U.S. PATENT DOCUMENTS

| | | | |
|---|---|---|---|
| 3,591,351 | A | 7/1971 | Ullman |
| 3,642,550 | A | 2/1972 | Doll |
| 3,642,967 | A | 2/1972 | Doll |
| 3,655,501 | A | 4/1972 | Tesch |
| 3,673,057 | A | 6/1972 | Fairbanks |
| 3,781,183 | A | 12/1973 | Doll |
| 3,806,390 | A | 4/1974 | Balk et al. |
| 3,819,006 | A | 6/1974 | Westlund |
| 3,819,007 | A | 6/1974 | Wirt |
| 3,864,198 | A | 2/1975 | Jackson |
| 3,900,648 | A | 8/1975 | Smith |
| 3,950,474 | A | 4/1976 | Cunningham |
| 3,966,044 | A | 6/1976 | Cunningham |
| 3,985,600 | A | 10/1976 | Blais |
| 4,001,473 | A | 1/1977 | Cook |
| 4,007,388 | A | 2/1977 | Lawyer et al. |
| 4,111,081 | A | 9/1978 | Hilliard |
| 4,294,875 | A | 10/1981 | Schramm |
| 4,295,637 | A | 10/1981 | Hulek |
| 4,303,714 | A | 12/1981 | Mercer |
| 4,303,747 | A | 12/1981 | Bender |
| 4,363,739 | A | 12/1982 | Okamura et al. |
| 4,384,020 | A | 5/1983 | Beggs |
| 4,416,715 | A | 11/1983 | Schramm et al. |
| 4,465,725 | A | 8/1984 | Riel |
| 4,510,010 | A | 4/1985 | Schramm et al. |
| 4,520,124 | A | 5/1985 | Abe et al. |
| 4,556,593 | A | 12/1985 | Hughes |
| 4,578,070 | A | 3/1986 | Holtman |
| 4,615,671 | A | 10/1986 | Bernal |
| 4,821,839 | A | 4/1989 | D'Antonio et al. |
| 4,842,794 | A | 6/1989 | Hovis et al. |
| 4,879,084 | A | 11/1989 | Parnigoni |
| 4,879,152 | A | 11/1989 | Green |
| 4,985,106 | A | 1/1991 | Nelson |
| 5,002,427 | A | 3/1991 | Kambe et al. |
| 5,044,705 | A | 9/1991 | Nelson |
| 5,055,341 | A | 10/1991 | Yamaji et al. |
| 5,056,341 | A | 10/1991 | Mori et al. |
| 5,110,266 | A | 5/1992 | Toyoshima et al. |
| 5,136,765 | A | 8/1992 | Tanaka et al. |
| 5,139,596 | A | 8/1992 | Fell |
| 5,151,018 | A | 9/1992 | Clendenin et al. |
| 5,239,735 | A | 8/1993 | Tanaka et al. |
| 5,272,285 | A | 12/1993 | Miller |
| 5,374,118 | A | 12/1994 | Kruck et al. |
| 5,379,568 | A | 1/1995 | Murray |
| 5,432,306 | A | 7/1995 | Pfordresher |
| 5,461,761 | A | 10/1995 | Knopfli et al. |
| 5,496,610 | A | 3/1996 | Landi et al. |
| 5,503,172 | A | 4/1996 | Hedeen et al. |
| 5,515,702 | A | 5/1996 | Park |
| 5,543,198 | A | 8/1996 | Wilson |
| 5,547,743 | A | 8/1996 | Rumiesz, Jr. et al. |
| 5,705,252 | A | 1/1998 | Lea et al. |
| 5,714,107 | A | 2/1998 | Levy et al. |
| 5,714,226 | A | 2/1998 | Disselbeck |
| 5,755,900 | A | 5/1998 | Weir et al. |
| 5,816,305 | A | 10/1998 | May |
| 5,848,509 | A | 12/1998 | Knapp et al. |
| 5,894,044 | A | 4/1999 | Norcom et al. |
| 5,897,951 | A | 4/1999 | Gallagher et al. |
| 5,965,851 | A | 10/1999 | Herreman et al. |
| 6,294,287 | B1 | 9/2001 | Lee et al. |
| 6,319,444 | B1 | 11/2001 | Kirk |
| 6,332,823 | B1 | 12/2001 | Rouse, Jr. |
| 6,512,831 | B1 | 1/2003 | Herreman et al. |
| 6,539,955 | B1 | 4/2003 | Tilton |
| 6,669,265 | B2 | 12/2003 | Tilton et al. |
| 6,673,415 | B1 | 1/2004 | Yamazaki et al. |
| 6,726,974 | B1 | 4/2004 | Pflug et al. |
| 6,736,470 | B2 | 5/2004 | Manke et al. |
| 6,793,037 | B1 | 9/2004 | Babuke et al. |
| 6,973,702 | B2 | 12/2005 | Harashige |
| 7,923,092 | B2 * | 4/2011 | Rockwell ...................... 428/116 |
| 2001/0033923 | A1 | 10/2001 | Mulder et al. |
| 2002/0010229 | A1 | 1/2002 | Medoff et al. |
| 2002/0134615 | A1 | 9/2002 | Herreman et al. |
| 2003/0096548 | A1 | 5/2003 | Groitzsch et al. |
| 2004/0109994 | A1 | 6/2004 | Ma et al. |
| 2004/0116027 | A1 | 6/2004 | Termonia et al. |
| 2005/0092353 | A1 | 5/2005 | Retsema |
| 2005/0123720 | A1 | 6/2005 | Suzuki et al. |
| 2005/0150720 | A1 | 7/2005 | Tudor et al. |
| 2006/0000186 | A1 | 1/2006 | Carlson et al. |
| 2006/0008614 | A1 * | 1/2006 | Rockwell et al. ............ 428/116 |
| 2006/0008616 | A1 | 1/2006 | Dean et al. |
| 2006/0162997 | A1 | 7/2006 | Cooksey et al. |
| 2007/0042156 | A1 | 2/2007 | Rockwell |
| 2007/0054090 | A1 | 3/2007 | Rockwell |
| 2008/0067002 | A1 | 3/2008 | Pfaffelhuber et al. |

FOREIGN PATENT DOCUMENTS

| | | | |
|---|---|---|---|
| DE | 4225278 | | 2/1994 |
| DE | 199 07 146 | | 8/2000 |
| DE | 101 18 632 | | 10/2002 |
| EP | 0 352 993 | | 1/1990 |
| EP | 0718570 | | 6/1996 |
| EP | 0 933 131 | | 4/1999 |
| EP | 1 277 865 | | 5/2002 |
| EP | 1 772 480 | | 4/2007 |
| EP | 2 022 678 | | 2/2009 |
| FR | 2214932 | | 8/1974 |
| GB | 1515455 | | 6/1978 |
| GB | 2122540 | | 1/1984 |
| JP | 61246542 | | 11/1986 |
| JP | 3237961 | | 10/1991 |
| JP | 8049871 | | 2/1996 |
| JP | 02000255587 | A | 9/2000 |
| WO | WO 00/32382 | A1 | 6/2000 |
| WO | WO 2006/017297 | | 2/2006 |

OTHER PUBLICATIONS

Ashley, Marjorie, Grandpa's Flower Garden, "Annie's Pattern Club", Oct.-Nov. 1988, No. 53 pp. 10-13.

International Search Report PCT/US2006/032597 dated Mar. 21, 2007.

International Search Report PCT/US2007/005103 dated Sep. 12, 2007.

International Search Report PCT/US2009/050991 dated Nov. 4, 2009.

International Search Report PCT/US2009/052652 dated Feb. 16, 2010.

Office Action from Chinese Patent Application No. 200680030595.9, dated Aug. 21, 2009, 6 pages.

Response to Aug. 21, 2009Office Action from Chinese Patent Application No. 200680030595.9, dated Dec. 22, 2009, 7 pages; No English translation is readily available for this response.

* cited by examiner

DIE CUT INSULATION BLANKET

This application is a continuation-in-part of prior U.S. patent application Ser. No. 11/209,005 filed on 22 Aug. 2005.

TECHNICAL FIELD AND INDUSTRIAL APPLICABILITY OF THE INVENTION

The present invention relates generally to a die cut insulation blanket that may be made utilizing less material per unit of perimeter area.

BACKGROUND OF THE INVENTION

Perforated non-woven fabrics of polymer material are well known in the art. Representative examples include U.S. Pat. Nos. 5,714,107 to Levy et al., 4,615,671 to Bernal and 3,864,198 to Jackson. In each of these prior art patents the polymer material is slit or cut and then subjected to stretching to provide a honeycomb web or open cell structure.

Unfortunately, the stretching of the material to open the honeycomb or cellular structure leads to the tearing of a significant number of the fiber-to-fiber bonds thereby reducing the strength and integrity of the resulting material. Further, the tearing of so many bonds also increases the friability of the material. Thus, erection of the honeycomb web or cellular material in accordance with prior art methods leads to two significant detrimental results.

Co-pending U.S. patent application Ser. Nos. 10/889,442 filed on 12 Jul. 2004 and 11/024,081 filed on 28 Dec. 2004 (owned by the assignee of the present invention) disclose a honeycomb web precursor and a method of producing a honeycomb web of polymer material wherein the precursor is erected by folding rather than stretching. Accordingly, the resulting product has improved fiber-to-fiber bond integrity and exhibits reduced friability when compared to prior art cellular structures.

The present invention relates to a further improvement that utilizes a novel slit pattern to produce an expanded panel with substantially triangular shaped openings that is suited for a number of different applications.

SUMMARY OF THE INVENTION

In accordance with the purposes of the present invention as described herein, an expandable insulation blanket is provided. The insulation blanket comprises a body of insulation material including a first edge and a second edge wherein the first edge is opposite the second edge. The insulation blanket further includes a first, substantially h-shaped slit defining a first hinge point between a first end of the first slit and the first edge, a second hinge point between a second end of the first slit and the second edge and a third hinge point between a third end of the first slit and the first edge. A first hinge body is outlined by the first slit, the first hinge point and the third hinge point. In addition the insulation blanket includes a second slit extending across the first hinge body and defining a fourth hinge point between the second slit and the first slit.

The insulation material is a polymer material. The insulation material is selected from a non-woven synthetic material, a non-woven natural material and mixtures thereof. More specifically, the insulation material is selected from a group consisting of thermoplastic fiber material, thermosetting fiber material, bicomponent fiber material and mixtures thereof. Still more specifically, the insulation material may be selected from a group of materials consisting of polyolefin, polypropylene, polyethylene, polyester, nylon, rayon, polyethylene terephthalate, polybutylene terephthalate, cotton, kenaf, silk, cellulose, hemp, jute, sisal, shoddy and mixtures thereof.

In accordance with yet another aspect of the present invention the insulation material includes reinforcing fibers. Those reinforcing fibers may be selected from a group of materials consisting of glass fibers, metal fibers, mineral fibers, carbon fibers, graphite fibers, natural fibers and mixtures thereof.

In one possible embodiment of the invention, the insulation blanket further includes a third, substantially h-shaped slit defining a fifth hinge point between a first end of the third slit and the second edge, a sixth hinge point between a second end of the third slit and the first edge and a seventh hinge point between a third end of the third slit and the second edge. Accordingly, a second hinge body is outlined by the third slit, the fifth hinge point and the seventh hinge point. A fourth slit extends across the second hinge body and defines an eighth hinge point between the fourth slit and the third slit.

In accordance with an additional aspect of the present invention the expandable insulation blanket may be alternatively defined as comprising a body of insulation material including a first edge and a second edge wherein the first edge is opposite the second edge. A substantially h-shaped first slit is provided adjacent the first edge. A first hinge body is outlined by the first slit. In addition, the insulation blanket includes a second slit extending partially across the first hinge body.

In one possible embodiment the insulation blanket further includes a substantially h-shaped third slit adjacent one of the first edge and the second edge, a second hinge body outlined by the third slit and a fourth slit extending partially across the second hinge body.

In the following description there is shown and described several possible embodiments of the present invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings.

Reference will now be made in detail to the present preferred embodiments of the invention, examples of which are illustrated in the accompanying drawings.

DETAILED DESCRIPTION OF THE PREFERRED EMBODIMENTS OF THE INVENTION

Figure 1:
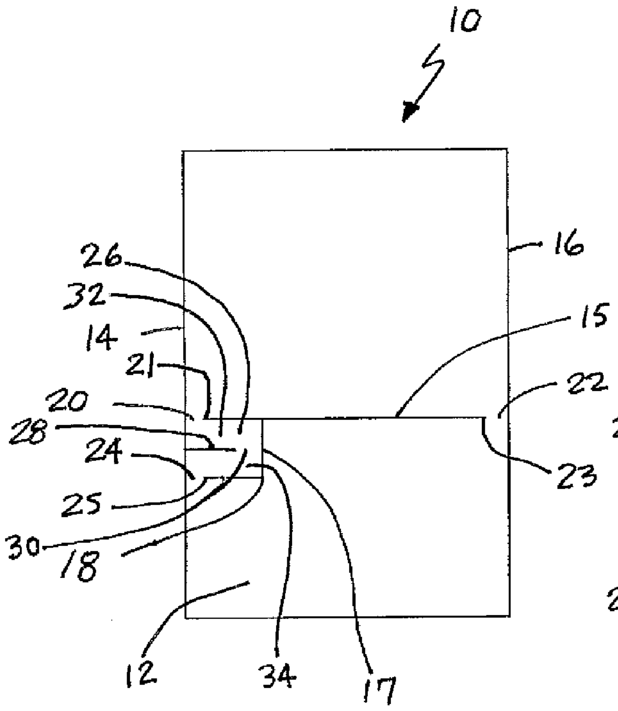
FIG. 1 is a top plan view illustrating the slitting of an unexpanded first embodiment of the insulation blanket of the present invention.

Reference is now made to FIG. 1 illustrating a first embodiment of the insulation blanket 10 of the present invention. As shown the insulation blanket 10 includes a body 12 formed from an insulation material. The body 12 includes a first edge 14 and a second edge 16 wherein the first and second edges 14, 16 are provided opposite one another.

A typical material useful in the construction of the insulation blanket 10 of the present invention is a non-woven synthetic material, a non-woven natural material and mixtures thereof. The material may include thermoplastic fiber material, thermosetting fiber material, bicomponent fiber material and mixtures thereof. Various polymers are particularly useful in the present invention. Still more specifically the material may be selected from a group consisting of polyolefin, polypropylene, polyethylene, polyester, nylon, rayon, polyethylene terephthalate, polybutylene terephthalate, cotton, kenaf, silk, cellulose, hemp, jute, sisal, shoddy and mixtures thereof.

The insulation material may further include reinforcing fibers. Those reinforcing fibers may be selected from a group of materials consisting of glass fibers, metal fibers, mineral fibers, carbon fibers, graphite fibers, natural fibers and mixtures thereof. Where glass fibers are utilized the material is typically made from E-glass. The glass fibers may be continuous fibers or staple fibers having a length of between about 1.27 and about 7.62 cm. The glass fibers typically have a diameter of between about 5 and about 50 microns.

As illustrated, the insulation blanket 10 of the FIG. 1 embodiment includes a first slit 18 that is substantially h-shaped. Thus, the first slit includes a substantially straight leg 15 and a substantially L-shaped leg 17. The first slit 18 defines a first hinge point 20 between a first end 21 of the first slit 18 and the first edge 14, a second hinge point 22 between a second end 23 of the first slit 18 and the second edge 16 and a third hinge point 24 between a third end 25 of the first slit 18 and the first edge 14. Thus, a first hinge body 26 is outlined by the legs 15, 17 of the first slit 18, the first hinge point 20 and the third hinge point 24.

As further illustrated in FIG. 1 a second slit 28 extends across the first hinge body 26 and defines a fourth hinge point 30 between the second slit 20 and the first slit 18. The second slit 28 divides the first hinge body 26 into a first hinge element 32 extending between the first hinge point 20 and the fourth hinge point 30 and a second hinge element 34 extending between the third hinge point 24 and the fourth hinge point 30.

Figure 2:
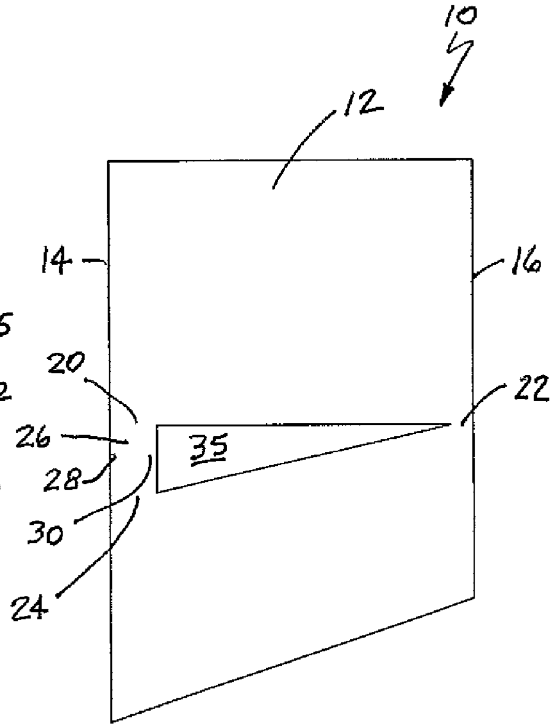
FIG. 2 is a top plan view illustrating the expanded first embodiment of the insulation blanket illustrated in FIG. 1.

FIG. 2 illustrates the embodiment of FIG. 1 in the expanded or erected condition. More specifically, the body 12 is expanded along the first slit 18 so that the first and second hinge elements 32, 34 open to extend along the first edge 14 of the body 12. This results in a relatively large triangular shaped opening 35 as the body 12 is expanded and the living hinges unfold at the first hinge point 20, second hinge point 22, third hinge point 24 and fourth hinge point 30.

Figure 3:
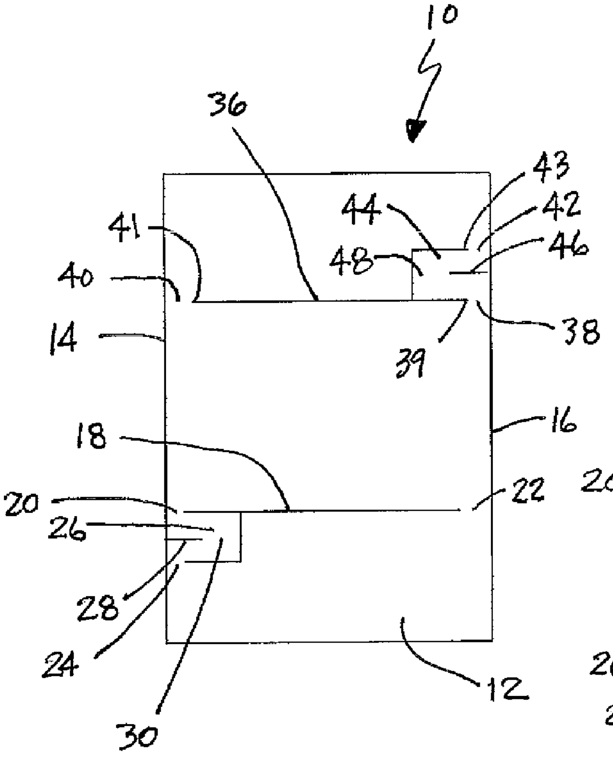
FIG. 3 is a top plan view illustrating the slitting of an unexpanded second embodiment of the insulation blanket of the present invention.
Figure 4:
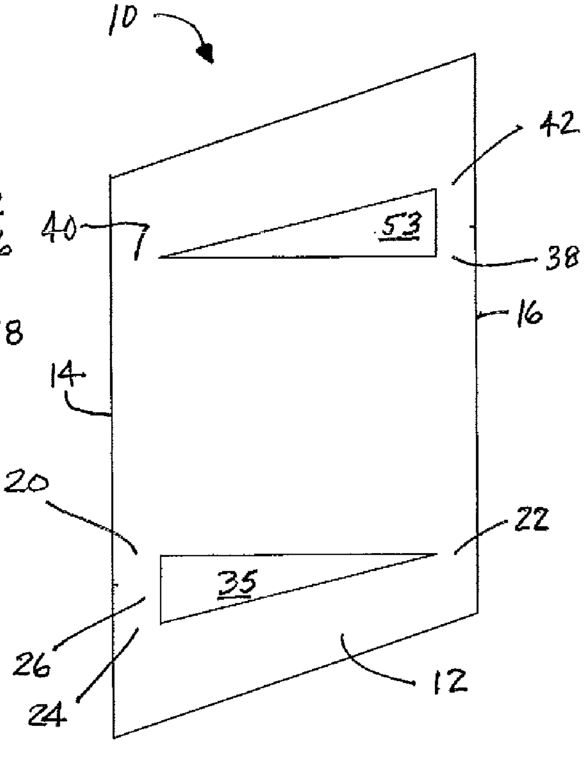
FIG. 4 is a top plan view illustrating the expanded second embodiment of the insulation blanket.

A second embodiment of the expandable insulation blanket 10 is illustrated in FIGS. 3 and 4. As illustrated in FIG. 3, the insulation blanket 10 includes all of the structures illustrated in the FIG. 1 embodiment and each of those structures is labeled with an identical reference number. In addition, the insulation blanket 10 illustrated in FIG. 3 includes a third slit 36 that is substantially h-shaped. The third slit 36 defines a fifth hinge point 38 between a first end 39 of the third slit 36 and the second edge 16, a sixth hinge point 40 between a second end 41 of the third slit 36 and the first edge 14 and a seventh hinge point 42 between a third end 43 of the third slit and the second edge. A second hinge body 44 is outlined by the third slit 36, the fifth hinge point 38 and the seventh hinge point 42. A fourth slit 46 extends across the second hinge body 44 and defines an eighth hinge point 48 between the fourth slit 46 and the third slit 36.

The second embodiment of the insulation blanket 10 is illustrated in the expanded or erected position in FIG. 4. When expanded, the first hinge body 26 opens to extend straight along the first edge 14 of the insulation blanket 10 while the second hinge body 44 opens to extend straight along the second edge 16 of the insulation blanket. As the hinges open at the hinge points 20, 22, 24, 30, 38, 40, 42 and 48, two triangular shaped openings 35 and 53 are formed.

Figure 5:
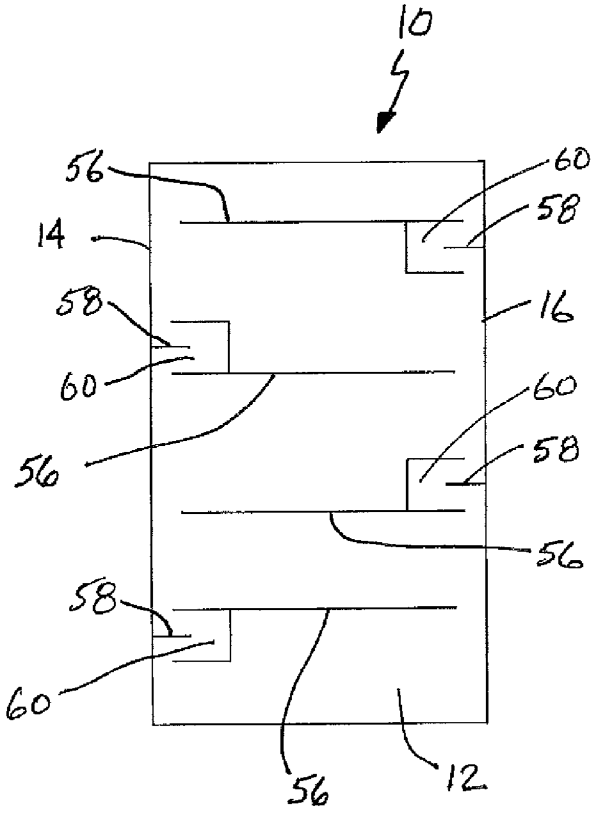
FIG. 5 is a top plan view illustrating the slitting of an unexpanded third embodiment of the insulation blanket of the present invention.
Figure 6:
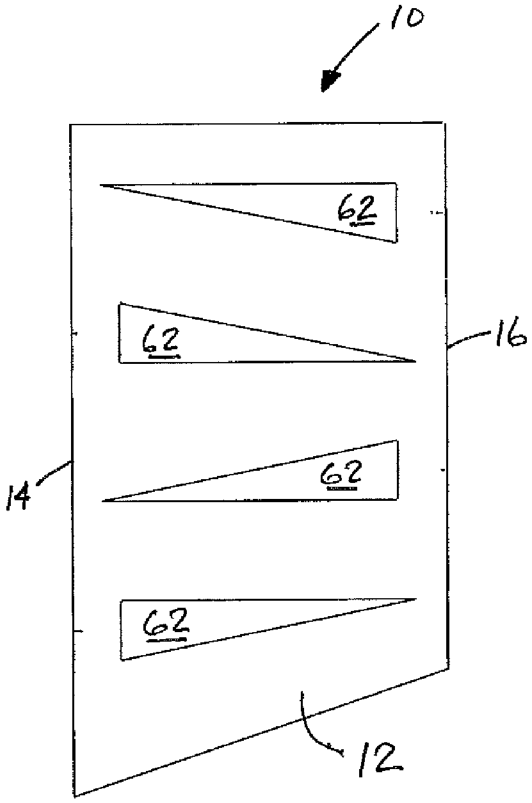
FIG. 6 is a top plan view illustrating the expanded third embodiment of the insulation blanket of the present invention.

Yet another embodiment of the insulation blanket 10 of the present invention is illustrated in the unexpanded position in FIG. 5 and the expanded position in FIG. 6. This embodiment includes multiple h-shaped slits 56 and multiple straight slits 58 defining multiple hinge bodies 60 along the length of the insulation blanket 10. When the insulation blanket 10 is expanded, the hinge bodies open and extend along the two edges 14, 16 of the body 12 and define a plurality of triangular shaped openings 62.

Depending on the size and number of the h-shaped slits 56, the area covered by the expanded insulation blanket 10, as illustrated in FIG. 6, compared to the original area of the insulation blanket 10, as illustrated in FIG. 5, may be increased by perhaps 150-500%. When opened and extending along the edges 14, 16 of the blanket 10, the opened hinge bodies 26, 44 and 60 provide a relatively thin or narrow strip of material conveniently located for looping over a hook or other structure. This allows the blanket to be conveniently mounted on a structure to be insulated such as an electrical appliance: that is, a dishwasher, clothes washer, dryer, range top, stove, oven or the like.

If desired, the insulation blanket 10 may be set in the erected or expanded condition illustrated in FIGS. 2, 4 and 6 in one of two ways. In the first way, the expanded insulation blanket 10 is heat treated above the thermoplastic and/or thermosetting fiber melt temperature and then cooled in order to thermally set the polymer material in the expanded or erected shape. Alternatively or in addition, a facing layer (not shown) may be adhered to a first face of the expanded insulation blanket 10. In yet another embodiment, a second facing layer (not shown) may be adhered to a second face of the insulation blanket 10. In either of these embodiments, the facing layers are sufficiently rigid to hold the insulation blanket 10 in the expanded or erected condition thereby maintaining the open cell structure with the triangular shaped openings 62. The first and second facing layers may be constructed from a number of materials including but not limited to polymer facings, foils, paper type facings, fiberglass reinforced mats, EVA (estervinylacetate), rubber materials and highly filled layers of materials around a reinforced web as well as mixtures thereof.

The foregoing description of the preferred embodiment of the present invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims in their fair and broad interpretation in any way.

What is claimed:

1. An expandable insulation blanket, comprising:

a body of insulation material including a first edge and a second edge wherein said first edge is opposite said second edge;

a substantially h-shaped first slit defining a first hinge point between a first end of said first slit and said first edge, a second hinge point between a second end of said first slit and said second edge and a third hinge point between a third end of said first slit and said first edge;

a first hinge body outlined by said first slit, said first hinge point and said third hinge point; and a second slit extending across said first hinge body and defining a fourth hinge point between said second slit and said first slit.

2. The insulation blanket of claim 1, wherein said insulation material is a polymer material.

3. The insulation blanket of claim 2, wherein said insulation material is selected from a group consisting of non-woven synthetic material, non-woven natural material and mixtures thereof.

4. The insulation blanket of claim 2, wherein said insulation material is selected from a group consisting of thermoplastic fiber material, thermosetting fiber material, bicomponent fiber material and mixtures thereof.

5. The insulation blanket of claim 4, wherein said insulation material is selected from a group consisting of polyolefin, polypropylene, polyethylene, polyester, nylon, rayon, polyethylene terephthalate, polybutylene terephthalate, cotton, kenaf, silk, cellulose, hemp, jute, sisal, shoddy and mixtures thereof.

6. The insulation blanket of claim 5, wherein said insulation material includes reinforcing fibers selected from a group consisting of glass fibers, metal fibers, mineral fibers, carbon fibers, graphite fibers, natural fibers and mixtures thereof.

7. The insulation blanket of claim 1, further including:

a third slit defining a fifth hinge point between a first end of said third slit and said second edge, a sixth hinge point between a second end of said third slit and said first edge and a seventh hinge point between a third end of said third slit and said second edge;

a second hinge body outlined by said third slit, said fifth hinge point and said seventh hinge point; and a fourth slit extending across said second hinge body and defining an eighth hinge point between said fourth slit and said third slit.

8. The insulation blanket of claim 7, wherein said third slit is substantially h-shaped.

9. The insulation blanket of claim 7, wherein said insulation material is a polymer material.

10. The insulation blanket of claim 9, wherein said insulation material is selected from a group consisting of non-woven synthetic material, non-woven natural material and mixtures thereof.

11. The insulation blanket of claim 10, wherein said insulation material is selected from a group consisting of thermoplastic fiber material, thermosetting fiber material, bicomponent fiber material and mixtures thereof.

12. The insulation blanket of claim 11, wherein said insulation material is selected from a group consisting of polyolefin, polypropylene, polyethylene, polyester, nylon, rayon, polyethylene terephthalate, polybutylene terephthalate, cotton, kenaf, silk, cellulose, hemp, jute, sisal, shoddy and mixtures thereof.

13. The insulation blanket of claim 12, wherein said insulation material includes reinforcing fibers selected from a group consisting of glass fibers, metal fibers, mineral fibers, carbon fibers, graphite fibers, natural fibers and mixtures thereof.

14. The insulation blanket of claim 1, wherein upon expanding said first hinge body said insulation blanket includes a substantially triangular opening.

15. The insulation blanket of claim 7, wherein upon expanding said first hinge body and said second hinge body said insulation blanket includes two substantially triangular openings.

16. An expandable insulation blanket, comprising:

a body of insulation material including a first edge and a second edge;

a substantially h-shaped first slit adjacent said first edge;

a first hinge body outlined by said first slit; and a second slit extending partially across said first hinge body.

17. The insulation blanket of claim 16, further including (a) a substantially h-shaped third slit adjacent one of said first edge and said second edge, (b) a second hinge body outlined by said third slit and (c) a fourth slit extending partially across said second hinge body.

18. An expandable insulation blanket, comprising:

a body of insulation material including a first edge and a second edge wherein said first edge is opposite said second edge;

a first slit defining a first hinge point between a first end of said first slit and said first edge, a second hinge point between a second end of said first slit and said second edge and a third hinge point between a third end of said first slit and said first edge;

a first hinge body outlined by said first slit, said first hinge point and said third hinge point; and a second slit extending across said first hinge body and defining a fourth hinge point between said second slit and said first slit;

wherein upon expanding said first hinge body said insulation blanket includes a substantially triangular opening.

19. The insulation blanket of claim 18, wherein said first slit is substantially h-shaped.

* * * * *